United States Patent [19]

Yamazaki et al.

[11] Patent Number: 4,999,555
[45] Date of Patent: Mar. 12, 1991

[54] DIGITIZING METHOD

[75] Inventors: Etsuo Yamazaki, Hachioji; Hiroo Nagata, Kokubunji, both of Japan

[73] Assignee: Fanuc Ltd., Minamitsuru, Japan

[21] Appl. No.: 362,407

[22] PCT Filed: Sep. 22, 1988

[86] PCT No.: PCT/JP88/00977
§ 371 Date: May 30, 1989
§ 102(e) Date: May 30, 1989

[87] PCT Pub. No.: WO89/03746
PCT Pub. Date: May 5, 1989

[30] Foreign Application Priority Data

Oct. 23, 1987 [JP] Japan .................. 62-267358

[51] Int. Cl.⁵ ............................. G05B 19/18
[52] U.S. Cl. ...................... 318/578; 318/571;
318/579; 364/474.03; 364/474.04; 364/474.37;
356/375; 356/376
[58] Field of Search ........ 318/568.1, 568.13, 568.16,
318/571, 573, 577–579, 640; 364/513, 167.01,
183, 561, 474.03–474.37, 475; 250/561, 237 G,
372; 356/375, 376, 371, 356, 386, 486, 351, 359,
360, 369, 354; 350/403, 407

[56] References Cited

U.S. PATENT DOCUMENTS

| | | | |
|---|---|---|---|
| 4,128,794 | 12/1978 | Burleson | 318/640 X |
| 4,158,507 | 6/1979 | Himmel | 356/371 X |
| 4,163,640 | 8/1979 | Higuchi et al. | 425/466 |
| 4,224,670 | 9/1980 | Yamazaki | 318/578 X |
| 4,243,370 | 1/1981 | Higuchi et al. | 425/462 |
| 4,350,965 | 9/1982 | Bachrach | 219/69.17 |
| 4,370,722 | 1/1983 | Imazeki et al. | 364/474.03 |
| 4,390,278 | 6/1983 | Inoue | 356/398 X |
| 4,424,570 | 1/1984 | Imazeki et al. | 318/578 X |
| 4,426,180 | 1/1984 | Imazeki et al. | 318/578 X |
| 4,456,962 | 6/1984 | Imazeki et al. | 318/571 X |
| 4,603,285 | 7/1986 | Matsuura et al. | 318/578 |
| 4,647,209 | 3/1987 | Neukomm et al. | 356/376 |
| 4,679,159 | 7/1987 | Yamazaki et al. | 364/474.03 |
| 4,687,433 | 8/1987 | Ozaki et al. | 425/464 |
| 4,688,179 | 8/1987 | Yamazaki | 318/578 X |
| 4,695,163 | 9/1987 | Schachar | 356/369 |
| 4,696,574 | 9/1987 | Penney | 356/375 |
| 4,707,610 | 11/1987 | Lindow et al. | 356/376 X |
| 4,709,198 | 11/1987 | Ogo et al. | 318/571 |
| 4,747,734 | 5/1988 | Ide et al. | 318/578 X |
| 4,750,835 | 6/1988 | McMurtry | 356/375 |
| 4,820,146 | 4/1989 | Inoue et al. | 425/461 |
| 4,850,712 | 7/1989 | Abshire | 356/376 |

FOREIGN PATENT DOCUMENTS 2600760  7/1977  Fed. Rep. of Germany .

OTHER PUBLICATIONS

Soviet Inventions Illustrated, Ch section, week 8444, Dec. 12, 1984; Derwent Publications Ltd., London, M 11; SU 1079-394-A (Kuib Aviation Inst.).

Primary Examiner—Paul Ip
Attorney, Agent, or Firm—Staas & Halsey

[57] ABSTRACT

A digitizing method in which a distance from a model surface is measured and stored at regular intervals of time or distance to obtain digital profile data of the model. A specified profile for correction is provided on a part of the model, and by using the specified mode, correction data such as a distance correction coefficient is obtained before carrying out the digitizing. Digitizing data obtained by carrying out the digitizing is corrected by the correction data. The correction data is obtained based on the material and surface condition of the actual model, and therefore, the digitizing data can be accurately corrected.

1 Claim, 4 Drawing Sheets

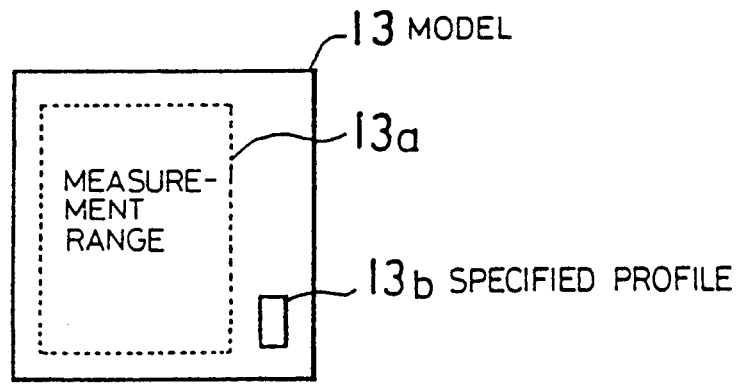
FIG. 2
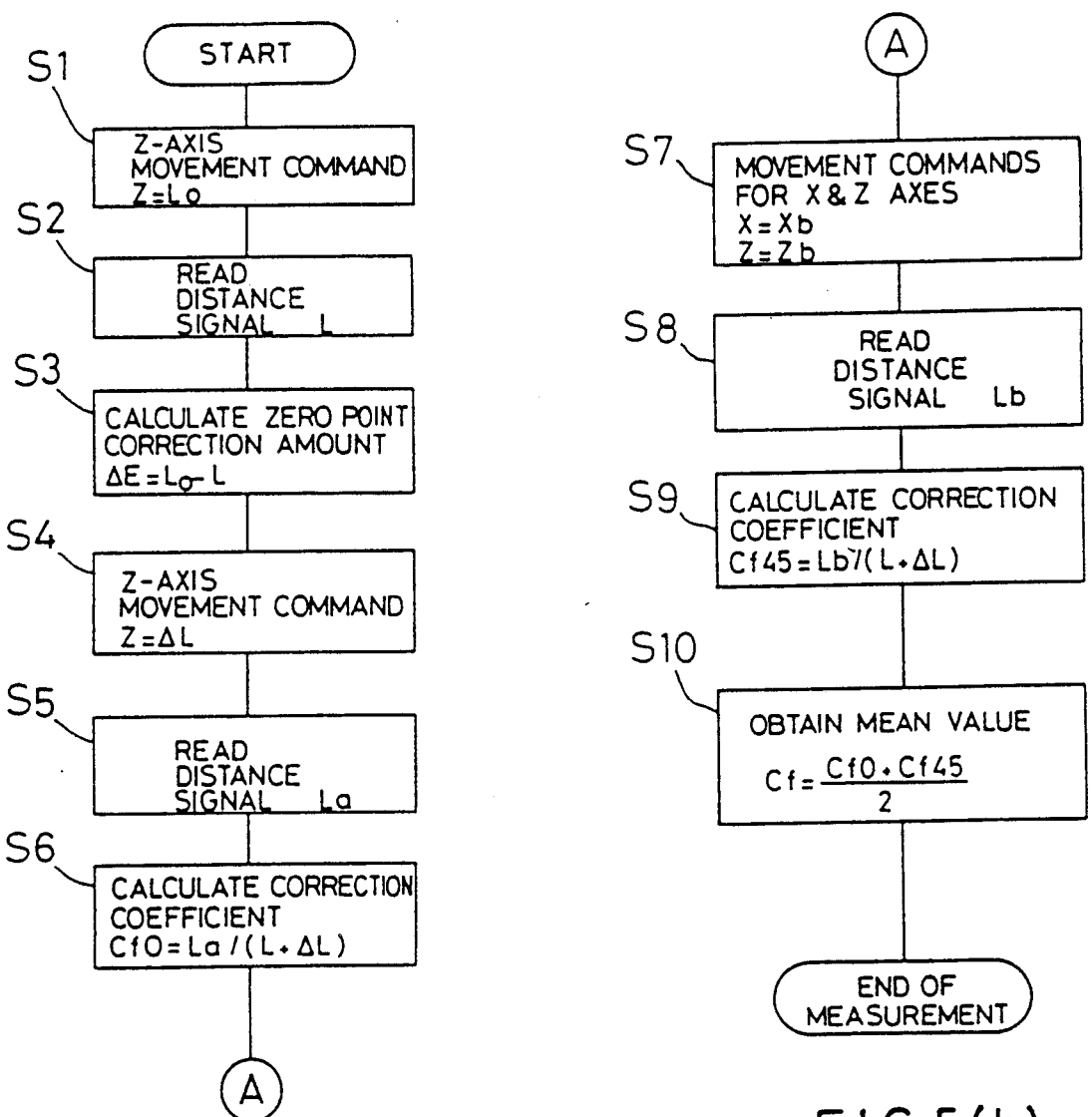
FIG. 5(a)
FIG. 5(b)

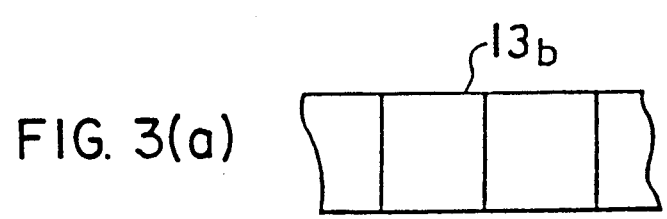
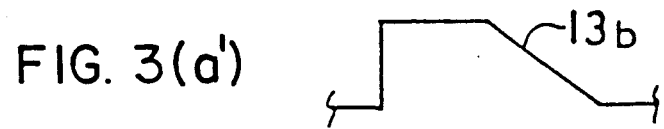
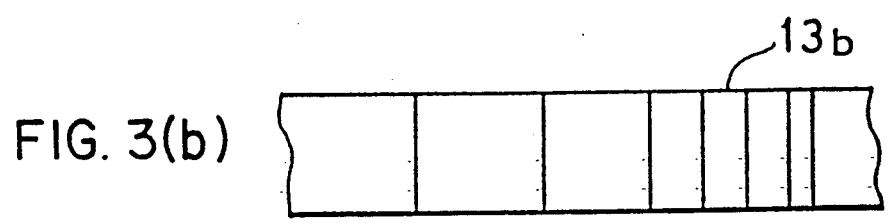
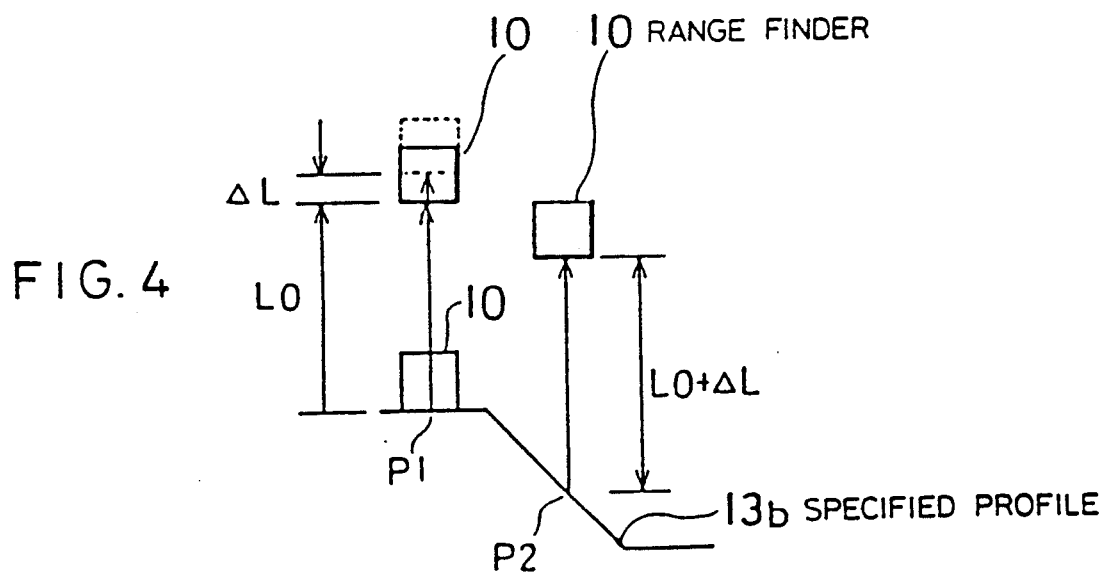

DIGITIZING METHOD

BACKGROUND OF THE INVENTION

Technical Field

The present invention relates to a digitizing method using a non-contact type range finder such as a laser range finder, and more particularly, to a digitizing method in which a specified profile is provided on a part of a model to obtain correction data for correcting digitizing data.

BACKGROUND ART

A digitizing method has been proposed which comprises irradiating a laser beam onto the surface of a model, measuring the distance from the model surface through detection of the reflected laser beam, and while performing a follow-up control to maintain the distance from the model surface at a constant value, reading a machine position of each axis at regular intervals of time or distance for storage in a memory.

The reflectivity of the model surface and the scattering rate of the reflected wave may vary in accordance with the material of the model used, thereby causing significant errors in measurements by a detection signal from a range finder, and thus lowering the accuracy of digitizing data. Accordingly, it is to obtain accurate digitizing data unless the materials and surface conditions of models are limited.

SUMMARY OF THE INVENTION

The object of the present invention is to solve the aforementioned problems and provide a digitizing method in which a specified profile is provided on a part of a model to obtain correction data for correcting digitizing data.

To solve the above problems, the present invention provides a digitizing method in which a distance from a surface of a model is measured and stored at regular intervals of time or distance to obtain digital profile data of the model, comprising providing a specified profile for correction on a part of the model, issuing a measurement command and obtaining correction data such as a distance correction coefficient, a zero point correction value, and the like from a command value and an actually measured value, by using the specified profile, before the start of digitizing, and correcting digitizing data obtained by carrying out the digitizing, by the correction data.

Using the specified profile provided on a part of the model before carrying out the digitizing, a constant distance command is issued and correction data is obtained from the command value and actual measurement data.

Therefore, the correction data is obtained based on the material and surface condition of the actual model, it is possible to accurately correct the digitizing data.

BRIEF DESCRIPTION OF THE DRAWINGS

FIG. 2 is a diagram showing a specified profile provided on a model;

FIG. 3(a) is a diagram showing an example of the specified profile;

FIG. 3(b) is a diagram showing another example of the specified profile;

FIG. 4 is a diagram for illustrating how correction data is obtained with the specified profile of FIG. 3(a);

FIG. 5 (a) and FIG. 5(b) are flowcharts for obtaining correction and data; and

DETAILED DESCRIPTION OF THE PREFERRED EMBODIMENT

An embodiment of the present invention will now be described with reference to the drawings.

Figure 1:
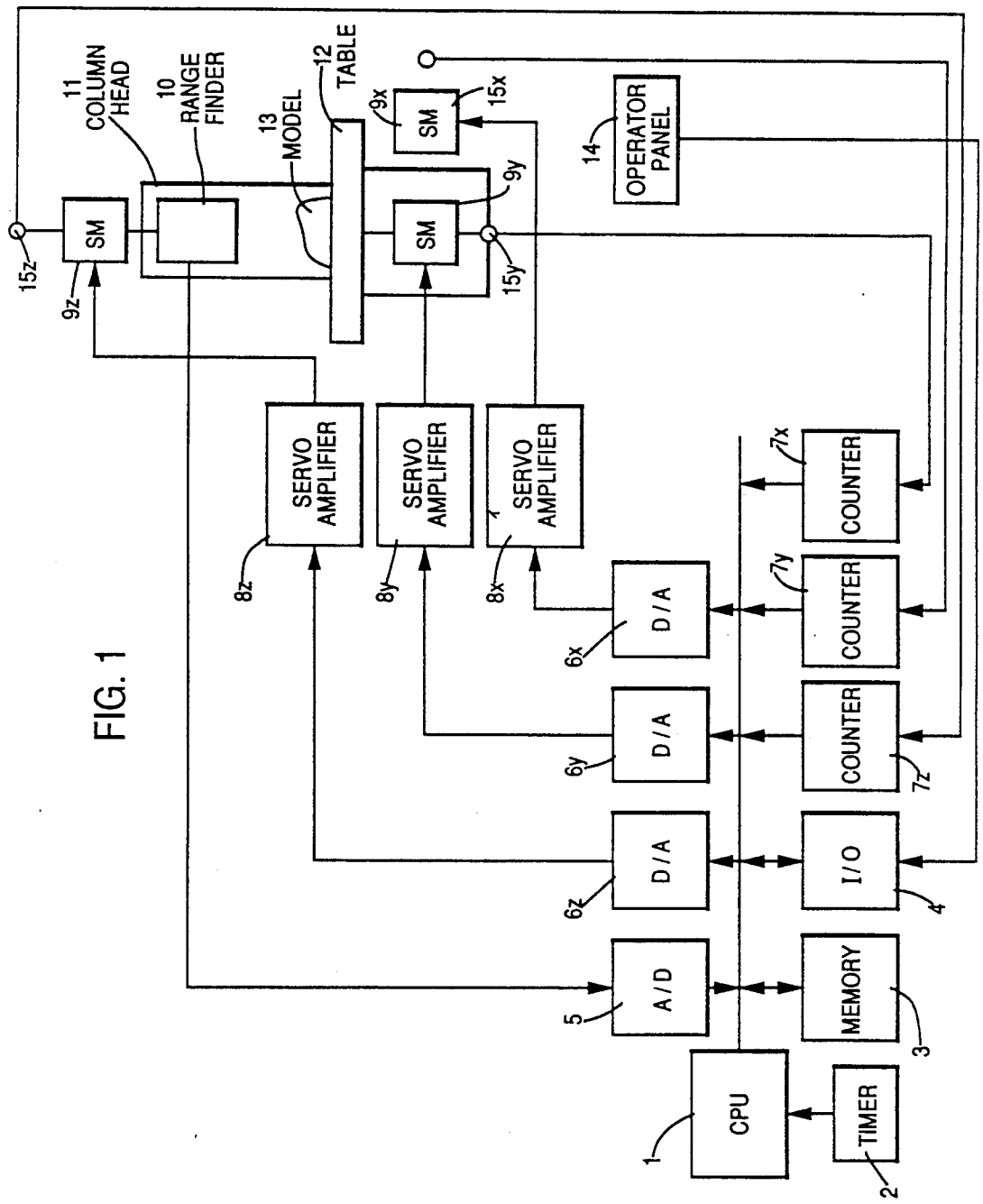
FIG. 1 is a block diagram of a device for carrying out a digitizing method according to the present invention.

FIG. 1 is a block diagram of a device for carrying out a digitizing data correction method according to the present invention. In FIG. 1, numeral 1 denotes a processor for global control, 2 denotes a timer for informing the processor 1 of an elapse of time, and 3 denotes a memory including a ROM storing a control program, a RAM for storing various parameters, data, etc., and the like An input/output signal interface (I/O) 4 carries out an exchange of input/output signal with an outside source, and an AD converter 5 converts an analog signal from a range finder 10 into a digital signal. Denoted at 6x, 6y, and 6z are DA converters for X, Y, and Z axes, respectively, for converting digital command values written by the processor 1 into analog values as outputs, and 7x, 7y, and 7z denote counters for the X, Y, and Z axes, respectively, which detect feedback pulses from a position detector (described below) and convert those pulses into data readable by the processor 1.

Servo amplifiers 8x, 8y, and 8z for the X, Y, and Z axes, respectively, receive analog signals from the DA converters 6x, 6y, and 6z to drive servomotors 9x, 9y, and 9z.

A range finder 10, which is a laser range finder in this embodiment, radiates a laser beam onto a model, receives a beam reflected by a model 13, and produces and delivers a voltage signal corresponding to the detected distance, to the AD converter 5 A column head 11 is constructed in such a manner that the range finder 10 can be moved vertically by the servomotor 9z. Denoted at 12 is a table on which the model 13 is secured; movements of which are controlled by the servomotors 9x and 9y. An operator panel 14 is used by an operator to control a machine, and a signal therefrom is connected to the input/output interface (I/O) 4.

The aforementioned servomotors are connected to respective position detectors 15x, 15y, and 15z, the output pulses of which are input to the counters 7x, 7y, and 7z.

A specified profile provided on the model 13 will now be described. FIG. 2 shows a specified profile provided on the model, wherein 13 denotes the model to be digitized, 13a a measurement range for the digitizing, and 13b the specified profile.

FIG. 3(a) shows an example of the specified profile, which is composed of a horizontal plane and a plane inclined at 45 degrees to the model. Correction data can be obtained from these two planes, as described hereinafter in detail.

FIG. 3(b) shows another example of the specified profile, which includes a horizontal plane and several planes inclined at different angles to the model surface. Correction data is obtained from each of these planes, and the obtained data is used for the corresponding plane of the model.

The procedure used to obtain the correction data will now be described in detail. FIG. 4 illustrates how the correction data is obtained with the specified profile 13b shown in FIG. 3(a). In FIG. 4, the range finder 10, which is a laser range finder in this embodiment, is first positioned at a point P1 on the plane of the specified profile 13b, through an operation of a button on the operator panel 14. Subsequently, the operator panel 14 is set in a measurement mode, and a start button is depressed to start a measurement operation.

The Z axis is first moved by a distance $L_O$ in the $+Z$ direction and a detection distance L from the range finder 10 is read, and then the Z axis is further moved in the $+Z$ direction by $\Delta L$ and a detection distance La from the range finder 10 is read.

Next, the Z axis is moved and is positioned at a point P2, then as for the measurement based on the point P1, the Z axis is moved in the $+Z$ direction by $L_O$ and $\Delta L$ to read a detection distance Lb, and as a result, a zero point compensation can be obtained from the following equation:

$$\Delta E = L_O - L$$

Subsequently, the distance correction coefficients are calculated. Namely, a correction coefficient for horizontal plane including the point P1 is obtained by $$Cf0 = La/(L_O + \Delta L)$$

and a correction coefficient for the 45-degree inclination plane including the point P2 is obtained from $$Cf45 = Lb/(L_O + \Delta L)$$

Based on the results of these calculations, a mean value Cfm of these two correction coefficients is obtained and used to correct a measured value of the range finder 10. Specifically, for an actually measured distance data L, a true value Lac is obtained from $$Lac = (L - \Delta E)/Cfm$$

The above operations will now be described with reference to FIG. 5(a) and FIG. 5(b) illustrating flowcharts for obtaining the correction data. In the figures, the number following "S" represents the number of the step, and only those operations after the positioning of the range finder 10 at the point P1 in FIG. 3 are explained in the flowcharts.

[S1] The Z axis is moved in the $+Z$ direction by $L_O$.
[S2] The distance signal L is read.
[S3] The zero point correction amount $\Delta E = L_O - L$ is calculated.
[S4] The Z axis is moved by $\Delta L$.
[S5] The distance signal La is read.
[S6] The correction coefficient is calculated by the following equation:

$$Cf0 = La/(L_O + \Delta L)$$

[S7] The range finder 10 is moved to the point P2 in FIG. 3, and then the Z axis is moved in the $+Z$ direction by $(L_O + \Delta L)$.

[S8] The distance signal Lb is read. [S9] The correction value for the 45-degree inclination plane is obtained by the following equation:

$$Cf45 = Lb/(L_O + \Delta L)$$

[S10] The mean value Cf of the above-mentioned correction coefficients is obtained by the following equation:

$$Cf = (Cf0 + Cf45)/2$$

and thus the correction coefficient is obtained.

Figure 6:
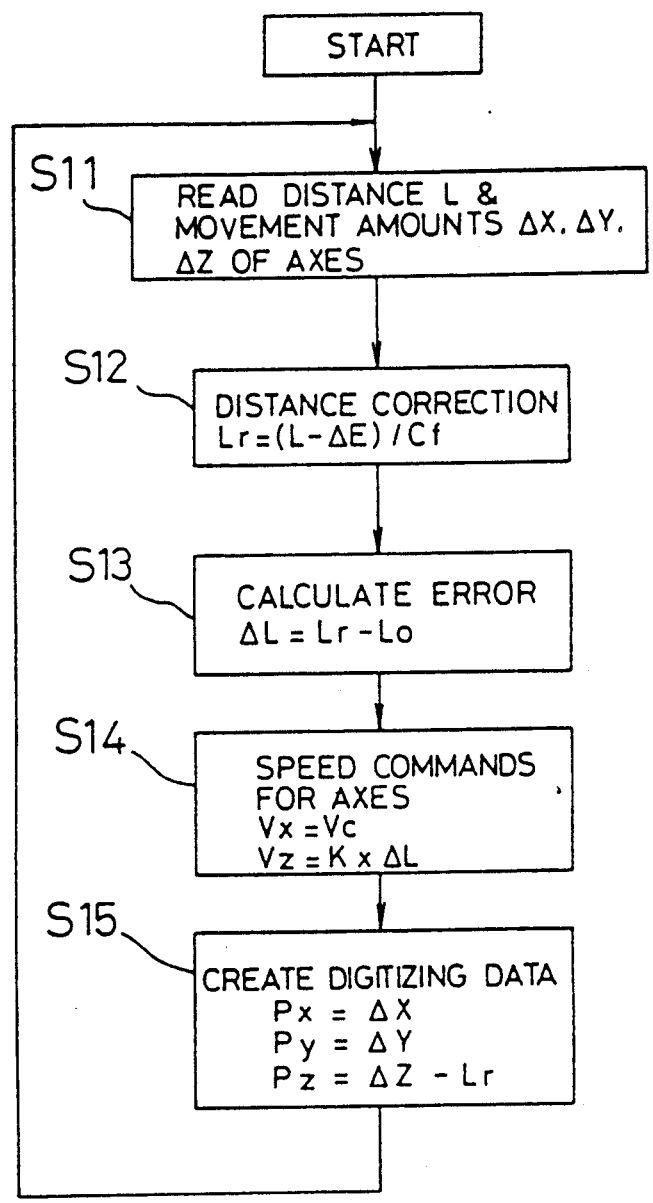
FIG. 6 is a flowchart of a digitizing method according to one embodiment of the present invention.

A digitizing operation using this correction coefficient will now be described with reference to FIG. 6, which is a flowchart of the digitizing method. In the figure, the number following "S" represents the step number.

[S11] The distance L and amounts $\Delta X$, $\Delta Y$, $\Delta Z$ of movement of the respective axes are read.
[S12] The distance $\Delta Z$ is corrected by the following equation:

$$Lr = (L - \Delta E)/Cf$$

[S13] An error is calculated by the following formula:

$$\Delta L = Lr - L_O$$

[S14] Speeds of the respective axes are calculated and commanded accordingly.
[S15] The digitizing data is collected.

In this manner, the data measured by the range finder 10 is corrected for carrying out the digitizing.

In the foregoing description, a mean value of the two correction coefficients for the horizontal plane and the 45-degree inclination plane is used as the correction coefficient, but another suitable correction coefficient may be used according to the model profile. For example, the specified profile shown in FIG. 3(b) may be used in such a way that correction coefficients are obtained for the respective planes and are suitably used according to the model profile.

Furthermore, although the above description is based on the use of a laser range finder, other range finders can be used as long as they are non-contact type.

According to the present invention, as described above, a specified profile is provided on a part of the model and correction data for correcting a measurement error of the range finder is obtained on the basis of the measurement of the specified profile. A measured distance is corrected by this correction data and then digitizing is carried out, thus making it possible to obtain accurate digitizing data.

What is claimed is:

1. A method for measuring a distance from a surface of a model, comprising the steps of:
    providing a specified profile on a portion of the model, for use in obtaining correction data;
    obtaining the correction data based on the specified profile, said correction data obtaining step including calculating a zero point correction amount and a mean value of a correction coefficient;
    measuring a distance from the surface of the model to obtain measured data; and
    obtaining digitized data based upon the obtained measured data and the correction data.

* * * * *

UNITED STATES PATENT AND TRADEMARK OFFICE
CERTIFICATE OF CORRECTION

PATENT NO.    : 4,999,555
DATED         : MARCH 12, 1991
INVENTOR(S)   : ETSUO YAMAZAKI ET AL.

It is certified that error appears in the above-identified patent and that said Letters Patent is hereby corrected as shown below:

Title Page:    [56] References Cited, U.S. PATENT DOCUMENTS,
                     line 3, delete line in its entirety;
                     line 5, delete line in its entirety;
                     line 6, delete line in its entirety;

Col. 2, line 5, delete line in its entirety;
                       lines 15-20, delete lines in their
                           entirety.

Col. 2,    line  6, "and data; and" should be --data; and--;
           line 21, "like An" should be --like.  An--;
           line 22, "signal" should be --signals--;
           line 41, "5 A" should be --5.  A--.

Col. 3,    line 27, "for hori-" should be --for the hori- --.

Signed and Sealed this

Eighth Day of December, 1992

*Attest:*

DOUGLAS B. COMER

*Attesting Officer*        Acting Commissioner of Patents and Trademarks